(12) United States Patent
Graan

(10) Patent No.: US 7,106,944 B2
(45) Date of Patent: Sep. 12, 2006

(54) SYSTEM AND METHOD FOR JUMPING TO A TIMEPOINT IN A MPEG FILE

(75) Inventor: Hans Graan, Motala (SE)

(73) Assignee: Nokia Corporation, Espoo (FI)

( * ) Notice: Subject to any disclaimer, the term of this patent is extended or adjusted under 35 U.S.C. 154(b) by 1106 days.

(21) Appl. No.: 09/893,132

(22) Filed: Jun. 27, 2001

(65) Prior Publication Data

US 2002/0026640 A1 Feb. 28, 2002

Related U.S. Application Data

(60) Provisional application No. 60/294,667, filed on May 31, 2001, provisional application No. 60/294,497, filed on May 30, 2001.

(51) Int. Cl.
*H04N 5/91* (2006.01)
(52) U.S. Cl. .......................................... 386/68; 386/95
(58) Field of Classification Search .................. 386/46, 386/68, 69, 70, 95
See application file for complete search history.

(56) References Cited

U.S. PATENT DOCUMENTS

| | | | |
|---|---|---|---|
| 5,630,005 A | 5/1997 | Ort | 386/69 |
| 5,715,176 A | 2/1998 | Mobini | 364/514 |
| 5,864,682 A | 1/1999 | Porter et al. | 395/200.77 |
| 6,012,086 A * | 1/2000 | Lowell | 709/218 |
| 6,144,691 A * | 11/2000 | Kenney | 375/130 |
| 6,157,771 A | 12/2000 | Brewer et al. | 386/69 |

\* cited by examiner

*Primary Examiner*—Huy Nguyen
(74) *Attorney, Agent, or Firm*—Cohen, Pontani, Lieberman & Pavane

(57) ABSTRACT

A system and method for performing seek or jump functions in a digitally stored audiovisual file are described. When the audiovisual file is recorded onto a storage medium, headers, which are distinct and separable from the audiovisual file datastream, are set in the audiovisual file in the storage medium. Each header contains a timestamp. When jumping/seeking, an estimated position for the desired timepoint on the storage medium is calculated by multiplying the storage unit per time unit rate by the desired timepoint. Then the system and method jumps to the estimated position, where the timestamp in the nearest header is checked to determine whether the time it indicates is close enough to the desired timepoint. If it is not, a new estimated position is calculated and the method repeats until either an iteration limit is reached or the estimated position is determined to be close enough to the desired timepoint.

24 Claims, 4 Drawing Sheets

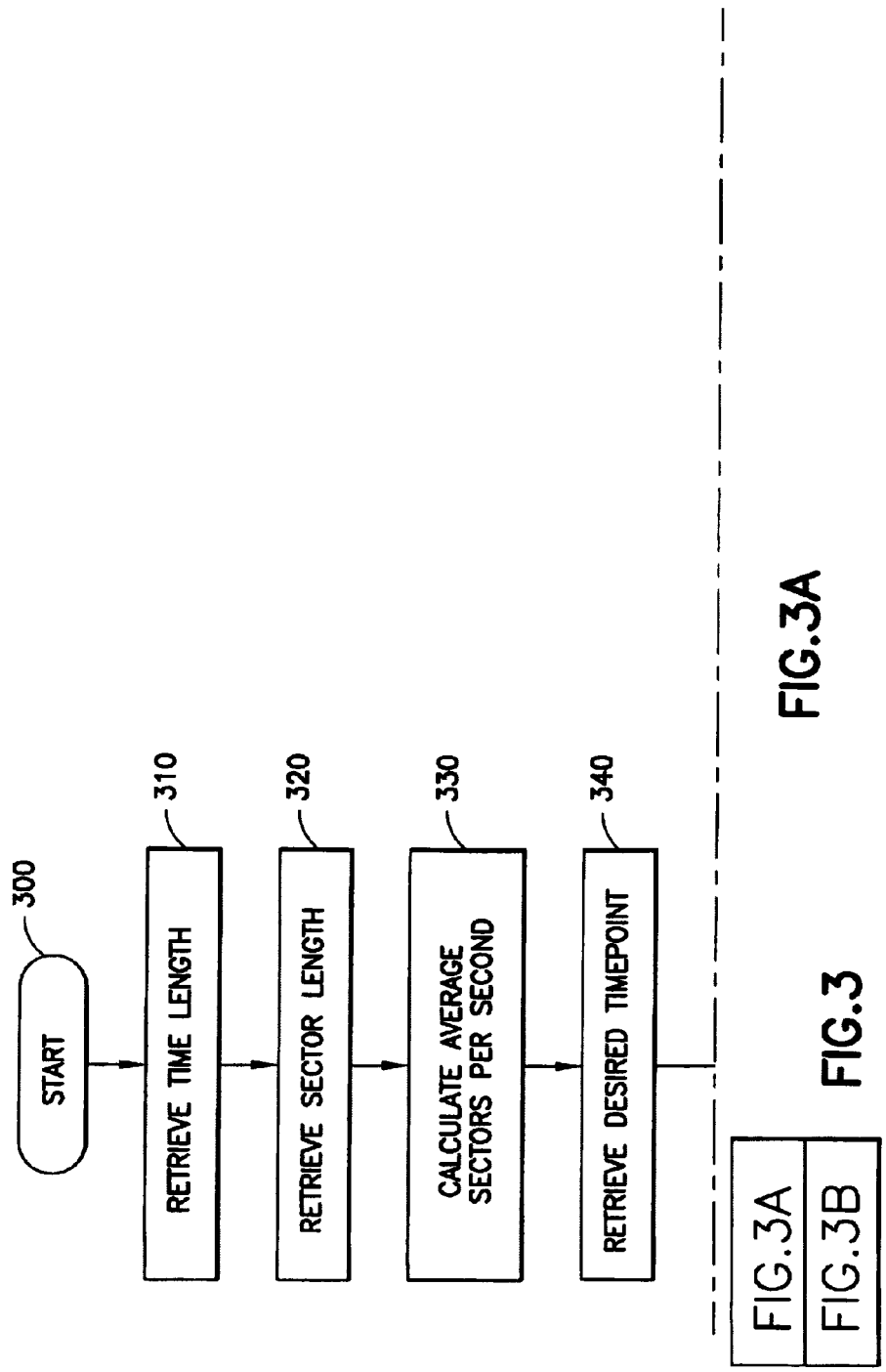

SYSTEM AND METHOD FOR JUMPING TO A TIMEPOINT IN A MPEG FILE

RELATED APPLICATIONS

This application claims priority from a U.S. Provisional Patent Application Ser. No. 60/294,497 filed on May 30, 2001, and U.S. Provisional Patent Application Ser. No. 60/294,667 filed on May 31, 2001.

BACKGROUND OF THE INVENTION

1. Field of the Invention

The present invention relates generally to digital audio and/or video data storage and playback, and, more particularly, to seeking a particular time point within a Moving Pictures Expert Group (MPEG) file.

2. Description of the Related Art

Developments in processing and storage technology have greatly expanded the ability of individuals to use microprocessor based devices for the recording and playback of sounds and images. As an example, individuals may now download songs onto a solid-state memory storage device, such as a portable MP3 player, and play the recorded song back at any time. In the area of moving pictures (with or without sound), MPEG is a popular standard for the recording and playback of digitally stored audio-visual files. The MPEG format provides an effective mechanism for efficiently compressing and decompressing digital video and/or audio signals and for supplying the decompressed signals to a playback mechanism for viewing. Although there are different versions of the MPEG standard, such as the old MPEG-1, the current MPEG-2, and the new MPEG-4, the term "MPEG" will be used herein to reference video and/or audio encoding and decoding algorithms and protocols promulgated in old, current, and future versions of MPEG.

Although MPEG plays back the stored audio-visual content at a constant frame rate, the standard stores the audio-visual content using a variable data rate. This is done to maximize the storage capacity of an MPEG file by taking advantage of the fact that sections of a video image do not change from frame to frame. Because these sections do not change, there is no need to store the data representing those sections when storing each sequential frame. Thus, the MPEG format encodes and records only those parts of sequential frames that are altered from frame to frame. But this results in the number of bytes representing a frame varying from frame to frame, depending on the amount of alteration between frames.

Because the stored MPEG format has a variable data rate (the number of bytes representing one frame may be twenty times greater than the number of bytes representing the next frame) but the frames are viewed (played back) at a constant data rate (usually between 30 and 50 frames per second), it is difficult to perform a seek, or jump, function (such as fast-forwarding to particular time point) in an MPEG file. To move through a MPEG file to a particular time point (or playback location), known as "seeking", prior art systems have resorted to parsing through the entire file until the time point (or frame number) that was sought is encountered in the encoded data. This method of seeking is time-consuming and uses up precious processing resources to perform the parsing.

Various solutions have been suggested in the prior art for the seek problem. In U.S. Pat. No. 5,630,005, a requested playback location referenced by a time or frame number is approximated by using the upper rate bound (maximum data rate) from a system header of the MPEG file. The method multiplies the upper rate bound by the requested playback time (which can be calculated from the frame number) in order to determine an approximate byte location in the MPEG file. A time stamp in the MPEG file near to the approximate byte location is read to determine whether the approximate byte location matches the requested playback time to within a predetermined degree. If it does not match within the predetermined degree, a new data rate is calculated and is used to determine a new approximate location. This repeats until a match is found. However, in practice, the upper rate bound is often set to 15 Mb/s by default, regardless of the actual value, to ensure that all rate variations will be covered, resulting in very large errors when the approximate byte location is calculated, requiring many iterations of the method before finding a correct match. Furthermore, recalculating the data rate during each iteration is wasteful of processing resources.

In U.S. Pat. No. 5,715,176, the requested playback location is approximated by calculating a byte rate using the system clock reference (SCR) bits in nearby pack headers. The MPEG data stream is broken down into packs, each of which consist of header information and a series of data packets. The pack header information includes the SCR, which is a snapshot of the system clock (of the original encoder). Each packet within the pack also has header information, which includes the time stamps mentioned above. The two SCRs neighboring the current byte position are found. The byte rate is calculated by using the distances (in bytes) between the current position and the two SCRs and the difference in time between the two SCRs. Having found the byte rate, an approximate byte location is determined and found (thus becoming the current byte position). A nearby time stamp is found and it is determined whether the approximate byte location matches the requested playback time within a predetermined degree. If it does not, the byte rate is re-calculated using the currently neighboring SCRs, and the process repeats. This means that the byte rate is being continually recalculated as the process iterates, thus using up processing resources.

In U.S. Pat. No. 5,864,682, the MPEG file is parsed to create a tag file, which may be used to determine seek positions within the MPEG file. However, this method requires the creation, processing, and storage of an additional file, which is wasteful of both processing and storage resources.

In U.S. Pat. No. 6,157,771, the requested playback location is approximated by first estimating the total number of frames in the MPEG file and then estimating the byte location using the estimated total number of frames, the file size in bytes, and the target frame number. The method then subtracts a predetermined number of seconds (in bytes) from the estimated byte location and then jumps to that calculated position. It is determined whether the next group of pictures (GOP) header indicates a frame number greater than the target frame number. GOPs hold many frames and are several orders of magnitude greater in size than packs or packets. If the indicated frame number is greater than the target frame number, the method backs up to the previous GOP header and reads a predetermined number of frames forward to identify the target frame. If the indicated frame number is not greater, the method jumps to the next GOP header and repeats. However, this type of seeking works best if the bit rate is constant, and may involve a great deal of jumping in MPEG files that have a great variation in the number of bytes per frame.

Therefore, there is a need for a system and method of seeking a particular point within an MPEG file without using too much processing and/or storage resources while still being sufficiently accurate.

SUMMARY OF THE INVENTION

It is an object of the present invention to provide a system and method of seeking a particular point within an MPEG file without using too much processing and/or storage resources while still being sufficiently accurate.

This and other objects are accomplished by the system and method according to the present invention. In one aspect, the presently preferred embodiment provides a method for performing a jump function to a desired timepoint in a digital audiovisual file. In the method, recording headers, each of which contains a timestamp, are set in the audiovisual file when first storing the audiovisual file on a storage medium. These recording headers are distinct from the datastream of the audiovisual file. When it is desired to jump to a desired timepoint, an estimated storage position on the storage medium of the desired timepoint is calculated. After jumping to the estimated storage position, the recording header nearest to the estimated storage position is found and its timestamp is read. If a timepoint indicated by the timestamp is within a predetermined time of the desired timepoint, the jump has been succesful. If not, a new estimated position is calculated and then jumped to in order to repeat the process until the timepoint indicated by the nearest timestamp is within the predetermined time.

In another aspect, the presently preferred embodiment provides a method for performing a jump function to a desired timepoint in a MPEG file. In the method, recording headers, each of which contains a timestamp, are set in the MPEG file when first storing the MPEG file on a storage medium. In addition, an associated filenode, containing a total timelength of the MPEG file and a total storage unit length of the MPEG file, is stored on the storage medium. When it is desired to jump to a desired timepoint in the MPEG file, the total timelength and the total storage unit length of the MPEG file are retrieved from the filenode so that an average storage unit per time unit rate can be calculated by dividing the total storage unit length by the total timelength. The estimated storage position is calculated by multiplying the average storage unit per time unit by the desired timepoint. Next, the method jumps to the estimated storage position, finds a recording header near to the estimated storage position, and reads a timestamp in the recording header. It is determined if a timepoint indicated by the timestamp is within a predetermined time of the desired timepoint. If it is not within the predetermined time, the number of times the method has iterated through these steps is determined. If the number of iterations exceeds a predetermined limit (or if the indicated timepoint is within the predetermined time), the method ends leaving the current estimated position. If not, an offset, or delta distance, is calculated and then applied to the current estimated position to calculate a new estimated position. At this point the method loops back to the jump step.

In yet another aspect, the presently preferred embodiment provides a digital audiovisual file storage system for performing a jump function to a desired timepoint in a digital audiovisual file. The system has a storage medium for storing the audiovisual file and a means for storing the audiovisual file on the storage medium. In addition, the system has: a means for setting recording headers in the audiovisual file on the storage medium, wherein the recording headers are distinct from a datastream of the audiovisual file; a means for setting a timestamp in each recording header; a means for calculating an estimated storage position on the storage medium of the desired timepoint; a means for jumping to the estimated storage position; a means for finding a recording header near to the estimated storage position; a means for reading a timestamp in the recording header; a means for determining if a timepoint indicated by the timestamp is within a predetermined time of the desired timepoint; and a means for re-calculating an estimated storage position.

In still another aspect, the presently preferred embodiment provides a Moving Pictures Expert Group (MPEG) file storage and retrieval system for performing a jump function to a desired timepoint in an MPEG file. In this system, a MPEG file source supplies the MPEG file to an integrated receiver decoder (IRD). The IRD is comprised of a first and second storage mediums and a processor. The first storage medium stores the received MPEG file and an associated filenode, which contains the total timelength and the total storage unit length of the MPEG file. The second storage medium stores programming code executable on said processor and the processor runs the stored code. The stored code includes: code for setting recording headers in the MPEG file on the storage medium, wherein the recording headers are distinct from a MPEG file datastream; code for setting a timestamp in each recording header; code for storing an associated filenode on the storage medium; code for calculating an estimated storage position on the storage medium of the desired timepoint; code for jumping to the estimated storage position; code for finding a recording header near to the estimated storage position; code for reading a timestamp in the recording header; code for determining if a timepoint indicated by the timestamp is within a predetermined time of the desired timepoint; and code for re-calculating a new estimated storage position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
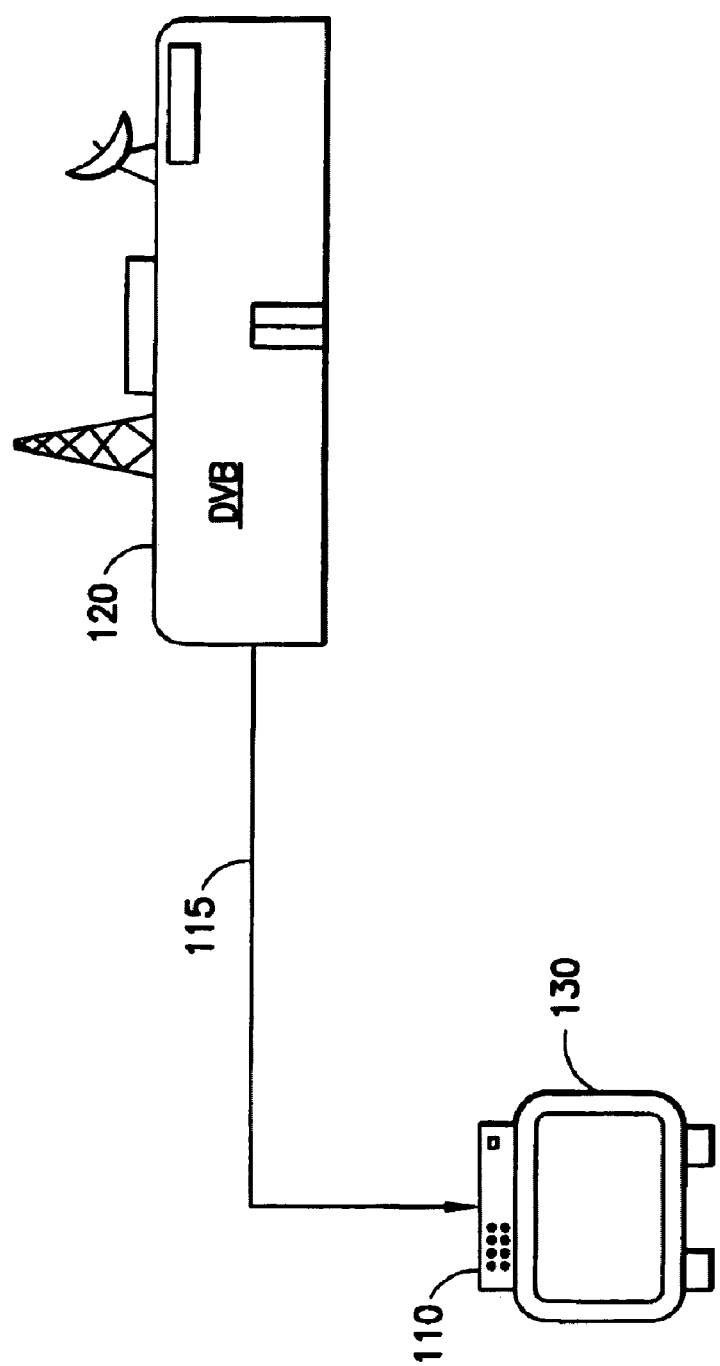
FIG. 1 is a diagram showing components of a digital video broadcast (DVB) system according to the presently preferred embodiment of the present invention.

The presently preferred embodiment of the present invention is implemented in a set-top box (STB), or integrated receiver decoder (IRD), as shown in FIG. 1. The IRD 110 receives television programming being broadcast in MPEG format from digital video broadcast (DVB) center 120 and presents a decoded signal to television set 130. In the presently preferred embodiment, the DVB center 120 broadcasts in MPEG-2 format. The communication link 115 over which the television programming is broadcast may be wired (e.g., cable, fiber-optic, etc.) or wireless (e.g., radiofrequency broadcast, satellite broadcast, etc.). Although the presently preferred embodiment is an IRD/STB in a digital television broadcast environment, other embodiments of the present invention may be implemented in computers, cell phones, personal digital assistants (PDAs), or any devices capable of playing back stored MPEG files. Likewise, the source of the MPEG files may be a portable storage medium, such as a digital versatile disc (DVD), the Internet, a cellular phone network, etc.

Figure 2:
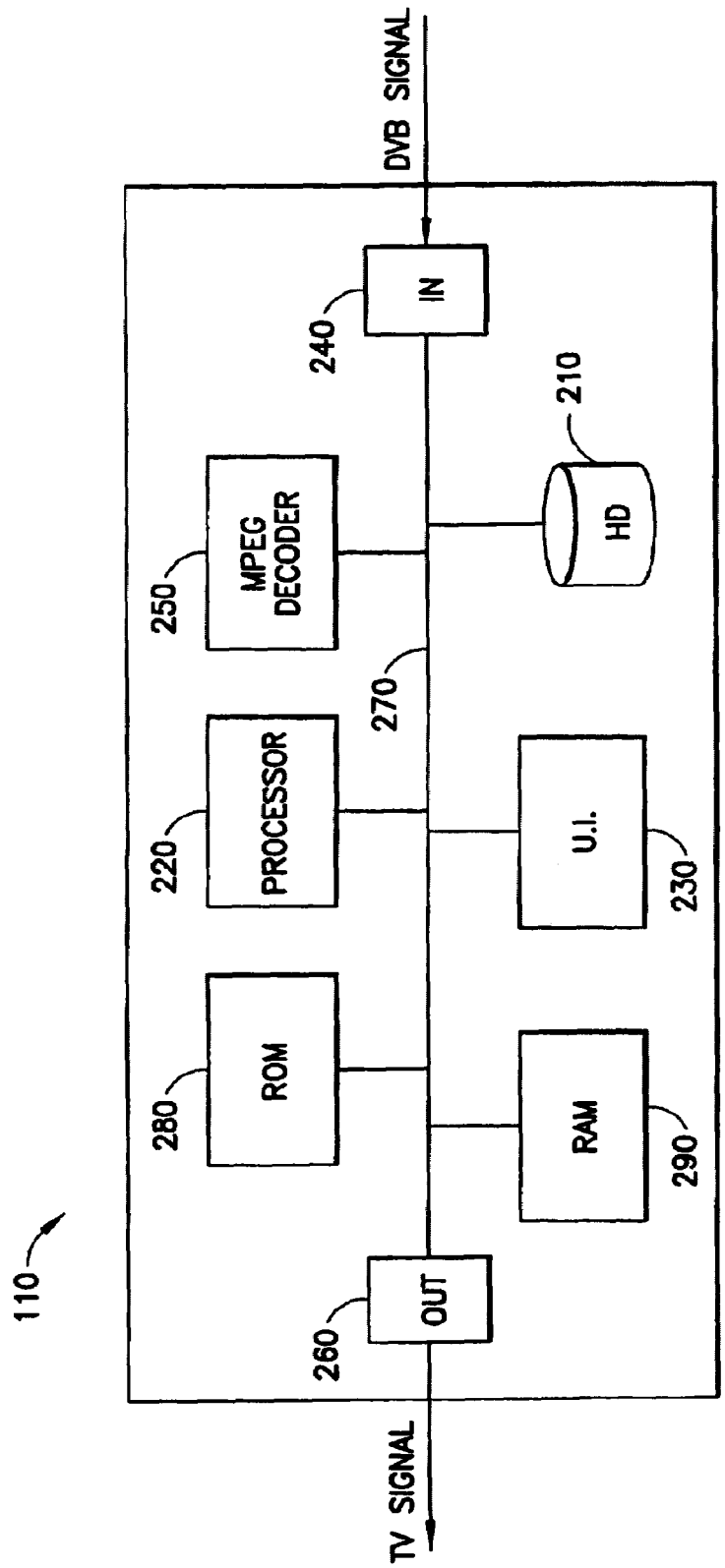
FIG. 2 is a block diagram of the functional modules in an integrated receiver decoder (IRD) according to the presently preferred embodiment of the present invention.

As shown in FIG. 2, IRD 110 is comprised of an input 240 for receiving the broadcast MPEG signals, an MPEG decoder 250 for decoding the MPEG signals, an output 260 for sending the decoded signals to the television set, a hard drive (HD) 210 for storing television programming in MPEG format, a processor 220 for controlling the IRD 110 and its components, a user interface unit 230 by which the user controls the IRD 110, a system bus 270, a read-only memory (ROM) module 280 for storing permanent data, and a random access memory (RAM) module 290 for storing temporary data. MPEG decoder 250 is an abstract representation of the function of MPEG decoding, and may be implemented in various parts of hardware and software in IRD 110. Likewise, system bus 270 is a simplification of the one or more dedicated or non-dedicated (i.e., broadcast, like over a system bus) communication links that would be needed between the various components of IRD 110. IRD 110 uses HD 210 for a storage medium, but any non-volatile storage medium would do, including solid state memories, such as flash memory, or a removable module, such as an optical disc. In the presently preferred embodiment, ROM 280 stores the operating system and other software required for the functioning of IRD 110. It should be noted that IRD 110 would require many additional components to perform its functions of receiving and decoding, as one skilled in the art would know, but these are not shown so as not to obscure the preferred embodiment of the present invention in unnecessary detail.

When IRD 110 is recording an MPEG file on HD 210, a filenode is created in RAM 280 and, once the recording has completed, the filenode is saved on HD 210 as well. The filenode contains the name, length in time (timelength), length in sectors (sectorlength), location (i.e., starting point) of the MPEG file on HD 210, and other information about the recorded MPEG file. A sector is a section on a hard drive (such as HD 210) and it is used as part of the file system of a hard drive. Because of the relatively small size of these sectors, they are a sufficiently exact measure when searching for a particular time position in an MPEG file. Yet they are larger than the MPEG packets, and so allow for faster seeking and searching on the hard drive. However, in other embodiments, the unit of file storage length could be bytes or any other applicable binary unit length or device-dependent unit length. The presently preferred embodiment uses the information stored in the filenodes to perform seek (jump) operations.

Figure 3B:
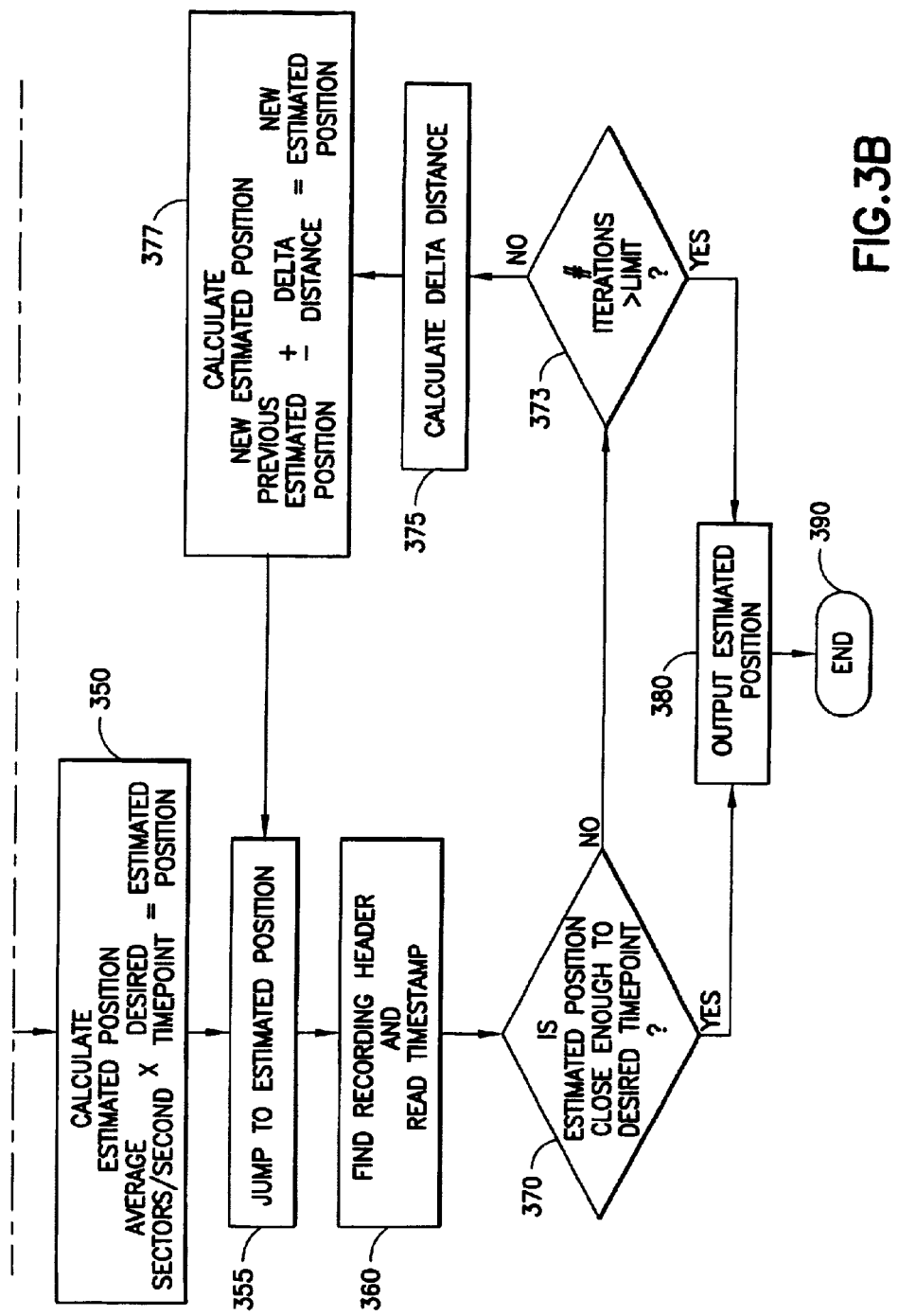
FIG. 3 is a flowchart of a method for jumping to a desired timepoint in a MPEG file according to the presently preferred embodiment of the present invention.

FIG. 3 shows the method employed by the presently preferred embodiment of the present invention. In the presently preferred embodiment, these steps are performed by an application running on processor 220. More precisely, the jump function (which performs the steps of the method) is called by the application environment (a higher level of software structure) of the IRD. The particular timepoint to which it is desired to jump in the MPEG file is given as an argument to the jump function when it is called by the application environment. In the presently preferred embodiment, either the relative timepoint (e.g. 15 minutes from what is now playing) or the absolute timepoint (e.g., 15 minutes from the start of the MPEG file) may be used as the argument to the jump function. Thus, the user has more options when asking for a particular timepoint to jump to.

In step 300 of FIG. 3, the method for finding a particular timepoint in a MPEG file starts. The timelength of the MPEG file is retrieved from the filenode corresponding to the MPEG file in step 310. The timelength is given in units of seconds, although any time unit (including "clocks" or "ticks" of the standard MPEG 90 kHz reference clock) may be used. The sectorlength of the MPEG file is retrieved from the filenode in step 320. In step 330, the average sectors per second of the MPEG file is calculated, by dividing the previously retrieved sectorlength by the timelength. The desired particular absolute or relative timepoint in the MPEG file is now retrieved in step 340. In the presently preferred embodiment, this step is superfluous because the desired timepoint was given as an argument to the jump function.

The estimated position of the desired timepoint is calculated in step 350 by multiplying the average sectors per second of the MPEG file (derived in step 330) by the desired timepoint (retrieved in step 340). In the presently preferred embodiment, the estimated position is given as a certain number of sectors to jump, either from the beginning of the MPEG file (if absolute) or from the current playback position in the MPEG file (if relative). In step 355, the method jumps to the estimated position.

In step 360, the recording header nearest to the estimated position is found and the timestamp in the recording header is read. Although similar to the headers in the MPEG datastream and files (as described by the MPEG standard), the recording headers are set in MPEG datastream as it is recorded to HD 210. As such, the recording headers are easily separable and identifiable from the MPEG file when they are searched for. The recording header timestamps are also set during the recording process by IRD 110. In the presently preferred embodiment, the recording headers occur approximately 20 times per second of recording in the MPEG file. In the beginning of the recording header there is a header identifier pattern designed in such a way that it cannot be mistaken for MPEG data. The recording header timestamp is provided by the IRD system clock and has a resolution of $\frac{1}{100}$ second.

In step 370, it is determined whether the time indicated by the recording header timestamp is close enough to the desired timepoint in the MPEG file. In the presently preferred embodiment, "close enough" is less than or equal to one second. A greater exactitude than one second is not needed because it is unlikely to be detected by the viewer, although another threshold may be used. Because the presently preferred embodiment of the present invention uses such a coarse granularity (within one second of the desired timepoint) in comparison to the prior art, which often focussed on finding a particular frame within the MPEG file, the presently preferred embodiment uses much less processing and storage resources than the prior art.

If the indicated time is close enough to the desired timepoint in step 370, the estimated position is output in step 380 and the method is finished at 390. In the presently preferred embodiment, the jump function returns, in step 380, the estimated position to the application environment, which will use another function call to display the MPEG file starting at the estimated position.

If the indicated time is not close enough to the desired timepoint in step 370, it is determined in step 373 whether the number of times the method has iterated through the loop of steps 360, 370, 373, 375, 377, and 355 has exceeded a predetermined limit. This is done to avoid lengthy processing times. In the presently preferred embodiment, the predetermined limit is 10 times. If the limit is exceeded in step 373, the method outputs whatever the current estimate is.

If the limit is not exceeded, the delta distance is calculated in step 375. The delta distance is the distance from the estimated position of the last iteration to the new estimated position, where the next iteration will continue. The calculation of the delta distance is based on the difference between the average sector per second rate calculated in step 330 and the actual average sector per second rate as determined from the indicated time in step 360 of the iteration. Although other ways of calculating a delta distance are possible, the preferred embodiment uses the following equation:

$$\begin{bmatrix} \text{Delta} \\ \text{Distance} \end{bmatrix} = \begin{bmatrix} \dfrac{\text{Sectorlength}}{\text{Timelength}} \\ \text{(from step 330)} \end{bmatrix} * \begin{bmatrix} \text{Desired} \\ \text{Timepoint} \end{bmatrix} - \begin{bmatrix} \text{Estimated} \\ \text{Timepoint} \end{bmatrix}$$

Once delta distance is calculated in step 375, the method calculates a new estimated position (=previous estimated position±delta distance) in step 377. Then the loop starts over by jumping to the new estimated position in step 355.

In the presently preferred embodiment, a simpler approach is used during fast forwarding and rewinding in order to minimize resource usage and overhead. When fast forwarding or rewinding, the average sector per second rate is calculated and used to determine the number of sectors to skip while "winding" in one direction or the other. The average sector per second rate is used in order to guarantee that the winding is proportionate to the playback duration time as perceived by the viewer, rather than proportionate to the variable data rate of the MPEG file. Unlike the jump function, there are no calculation re-iterations when fast forwarding and rewinding. This uses much less resources and is unlikely to be noticed, since fast forwarding and rewinding is less dependent on accurate positioning. Furthermore, in the presently preferred embodiment, if the MPEG file contains less than five seconds of data from the point where fast forwarding or rewinding is initiated, a rate of 900 sectors per second is used for video files and 25 sectors per second for audio-only files.

The attached appendix shows exemplary programming code for a jump function call according to the presently preferred embodiment. This jump function programming code is only intended as an example and in no way limits the present invention to any particular programming code. In fact, the method according to the present invention is not limited to being implemented in software, and may be implemented in hardware, or a mixture of hardware and software.

The system and method according to presently preferred embodiment as described above make some of the beneficial and unique features of the present invention apparent. First, unlike the prior art that re-calculated the byte rate at every iteration for re-estimating the location of the desired timepoint, the presently preferred embodiment does not re-calculate the byte rate at each iteration, but rather calculates a delta distance in order to jump to the next estimated position. The presently preferred embodiment uses an earlier determined (and, thus, static) byte rate to estimate the byte distance between the current position and where the desired timepoint should be, and then jumps that byte distance in the appropriate direction. Second, the presently preferred embodiment allows for much more granularity (within one second) in the search parameters in comparison to the prior art which sought one particular frame of the MPEG file. Third, the addition of recording headers, which are easily identifiable and separable from the MPEG datastream, gives the presently preferred embodiment an easy and efficient means to determine its timepoint location relative to the desired timepoint.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

APPENDIX

```
//----------------------------------------------------------------------------------------------------------------------
//
// jump_timepos
//
// Description:    Perform a absolute or relative jump in a file
//
// Parameters:     fh         filehandle to access the current files Filedescriptor
//                 mode       DVR_JUMP_FROM_CURRENT_POS, DVR_JUMP_FROM_START, DVR_JUMP_FROM_END
//                 offset     the amount of 0.01 seconds to jump
//                 curtime    current time position in the file, used in relative jumps.
//
// Returns:        DVR_Code
//----------------------------------------------------------------------------------------------------------------------
static DVR_Code jump_timepos(int fh, int mode, long offtime, long curtime)
{
```

APPENDIX-continued

```
long            seconds;
long            sectors, deltasectors;
float           rectime;
long            content;
long            sectorsPerSecond;
ulong           i = 0;
DVR_Code        ret = DVR_OK;
NMFS_Code       seek_ret = NMFS_OK;
if(mode == DVR_JUMP_FROM_CURRENT_POS)
      offtime = curtime + offtime;
else if(mode == DVR_JUMP_FROM_END)
      offtime = FileDesc(fh).rectime + offtime;
seconds = offtime / 100;                              // make seconds out of the time position
                                                      // (rounded downwards)
// set the type of content in the file that we want to check on.
content = (DVR_CONTENT_VIDEO | DVR_CONTENT_AUDIO);
#define deltatime (long)(((float)seconds * 100 - (float)PlayHeaderBuf[HEADER_REC_TIME] + (float)
FileDesc(fh).starttime)/ 100)
rectime = FileDesc(fh).rectime/100;
if(rectime == 0)
      sectorsPerSecond = (HasVideo(fh) ? 900 : 25);   // no playing time available; just pick some
                                                      // sane values (see function timepos_set_ratio)
else
      sectorsPerSecond = (long)((float)FileDesc(fh).file_length / rectime);
sectors = (long) (seconds * sectorsPerSecond);
if(seconds < 3) {
      seek_f_NMFS(fh, NMFS_SEEK_FROM_START, 0, NULL);
}
else if(seconds > rectime - 3) {
      seek_f_NMFS(fh, NMFS_SEEK_FROM_END, -3 * sectorsPerSecond, NULL);
}
else {
      seek_f_NMFS(fh, NMFS_SEEK_FROM_START, sectorsPerSecond * seconds, NULL);
}
ret = dvrGetHeader(fh, PlayHeaderBuf, NMFS_SEEK_RELATIVE, content);    // get the closest header
                                                                        // at this position
while (ret == DVR_OK && (abs((int)deltatime) > 1) && (seek_ret == NMFS_OK)) {
      // iterate until deltatime is less than one second
      tm_wkafter(1);
      deltasectors = deltatime * sectorsPerSecond;    // calculate a next jump.
      if(deltasectors + FileDesc(fh).cur_read > FileDesc(fh).file_length) {   // too close to end,
                                                                               // or outside file
            deltasectors = FileDesc(fh).file_length - FileDesc(fh).cur_read;
      }
      if(deltasectors + FileDesc(fh).cur_read < sectorsPerSecond) {   // too close to beginning
                                                                       // or outside file
            deltasectors = sectorsPerSecond - FileDesc(fh).cur_read;
            seek_ret = seek_f_NMFS(fh, NMFS_SEEK_FROM_START, sectorsPerSecond, NULL);
      }
      else {
            seek_ret = seek_f_NMFS(fh, NMFS_SEEK_RELATIVE, deltasectors, NULL);   // OK. seek to new position
      }
      if(i++ > 10)                                    // check that we don't get stuck in the loop,
                                                      // breaks after 10 iterations.
            ret = DVR_ERROR;
      else
            ret = dvrGetHeader(fh, PlayHeaderBuf,NMFS_SEEK_RELATIVE,content );  // get the closest header at
                                                                                 // this position
```

What is claimed is:

1. A method for performing a jump function to a desired timepoint in a digital audiovisual file comprising:
   a) when storing the audiovisual file to a storage medium:
      adding recording headers in the audiovisual file on the storage medium, wherein the recording headers are distinct from a datastream of the audiovisual file; and
      setting a timestamp in each recording header;
   b) calculating an estimated storage position on the storage medium of the desired timepoint;
   c) jumping to the estimated storage position;
   d) finding a recording header near the estimated storage position;
   e) reading a timestamp in the recording header;
   f) determining if a timepoint indicated by the timestamp is within a predetermined time of the desired timepoint; and
   g) if the indicated timepoint is not within the predetermined time:
      re-calculating an estimated storage position; and
      repeating steps (c) through (g).

2. The method as recited in claim 1, wherein step (b) comprises:
   determining a total timelength of the audiovisual file;
   determining a total storage unit length of the audiovisual file;
   calculating an average storage unit per time unit rate by dividing the total storage unit length by the total timelength; and calculating an estimated storage position by multiplying the average storage unit per time unit by the desired timepoint.

3. The method as recited in claim 2, wherein the storage medium is a hard disk and a storage unit used in the total storage unit length is a sector.

4. The method as recited in claim 2, wherein, when performing rewinding or fast forwarding through the audiovisual file, the average storage unit per time unit rate is used to calculate how much of the storage medium to skip over.

5. The method as recited in claim 1, wherein step (g) further comprises:
   determining a number of iterations of steps (c) through (g) that have been previously performed; and
   ending the method if the determined number of iterations exceeds a predetermined limit.

6. The method as recited in claim 1, wherein the re-calculating an estimated storage position sub-step of step (g) further comprises:
   calculating a delta distance, wherein the delta distance may be a positive or negative number; and
   calculating a new estimated storage position by adding the calculated delta distance to the current estimated storage position.

7. The method as recited in claim 6, wherein the delta distance is calculated using the following equation:

$$\begin{bmatrix} \text{Delta} \\ \text{Distance} \end{bmatrix} = \begin{bmatrix} \text{Sectorlength} \\ \text{Timelength} \end{bmatrix} * \begin{bmatrix} \text{Desired} \\ \text{Timepoint} \end{bmatrix} - \begin{bmatrix} \text{Estimated} \\ \text{Timepoint} \end{bmatrix}; \text{ and}$$

wherein Sectorlength is the total storage unit length of the audiovisual file,
   Timelength is the total timelength of the audiovisual file, and Estimated
   Timepoint is the indicated timepoint in step (f).

8. The method as recited in claim 1, wherein the audiovisual file is in Moving Pictures Expert Group (MPEG) format.

9. A method for performing a jump function to a desired timepoint in a Moving Picture Expert Group (MPEG) file comprising:
   a) when storing the MPEG file to a storage medium:
      (1) adding recording headers in the MPEG file on the storage medium, wherein the recording headers are distinct from a MPEG file datastream;
      (2) setting a timestamp in each recording header; and
      (3) storing an associated filenode on the storage medium, wherein the filenode comprises a total timelength of the MPEG file and a total storage unit length of the MPEG file;
   b) calculating an estimated storage position on the storage medium of the desired timepoint by:
      (1) retrieving a total timelength of the MPEG file from the associated filenode;
      (2) retrieving a total storage unit length of the MPEG file from the associated filenode;
      (3) calculating an average storage unit per time unit rate by dividing the total storage unit length by the total timelength;
      (4) calculating an estimated storage position by multiplying the average storage unit per time unit by the desired timepoint;
   c) jumping to the estimated storage position;
   d) finding a recording header near to the estimated storage position;
   e) reading a timestamp in the recording header;
   f) determining if a timepoint indicated by the timestamp is within a predetermined time of the desired timepoint; and
   g) if the indicated timepoint is not within the predetermined time:
      (1) determining a number of iterations of steps (c) through (g) that have been previously performed;
      (2) ending the method if the determined number of iterations exceeds a predetermined limit;
      (3) calculating a delta distance, wherein the delta distance may be a positive or negative number;
      (4) calculating a new estimated storage position by adding the calculated delta distance to the current estimated storage position; and
      (5) repeating steps (c) through (g).

10. A digital audiovisual file storage system for performing a jump function to a desired timepoint in a digital audiovisual file comprising:
    a storage medium for storing the audiovisual file;
    a means for storing the audiovisual file on the storage medium;
    a means for adding recording headers in the audiovisual file on the storage medium, wherein the recording headers are distinct from a datastream of the audiovisual file;
    a means for setting a timestamp in each recording header;
    a means for calculating an estimated storage position on the storage medium of the desired timepoint;
    a means for jumping to the estimated storage position;
    a means for finding a recording header near to the estimated storage position;
    a means for reading a timestamp in the recording header;
    a means for determining if a timepoint indicated by the timestamp is within a predetermined time of the desired timepoint; and
    a means for re-calculating an estimated storage position.

11. The digital audiovisual file storage system as recited in claim 10, further comprising:
    a processor being comprised of the means for calculating an estimated storage position on the storage medium of the desired timepoint, the means for finding a recording header near to the estimated storage position, the means for reading a timestamp in the recording header, the means for determining if a timepoint indicated by the timestamp is within a predetermined time of the desired timepoint; and the means for re-calculating an estimated storage position.

12. The digital audiovisual file storage system as recited in claim 11, further comprising:
    an integrated receiver decoder (IRD) for receiving digital video broadcast signals, said IRD being comprised of the processor.

13. The digital audiovisual file storage system as recited in claim 10, wherein the storage medium is a non-volatile memory.

14. The digital audiovisual file storage system as recited in claim 10, wherein the storage medium is one of a hard disk, an optical disk, and a solid-state memory.

15. The digital audiovisual file storage system as recited in claim 10, wherein the audiovisual file is in Moving Pictures Expert Group (MPEG) format.

16. The digital audiovisual file storage system as recited in claim 10, wherein the means for calculating an estimated storage position on the storage medium of the desired timepoint comprises:

a means for determining a total timelength of the audiovisual file;

a means for determining a total storage unit length of the audiovisual file;

a means for calculating an average storage unit per time unit rate by dividing the total storage unit length by the total timelength; and a means for calculating an estimated storage position by multiplying the average storage unit per time unit by the desired timepoint.

17. The digital audiovisual file storage system as recited in claim 16, wherein the storage medium is a hard disk and a storage unit used in the total storage unit length is a sector.

18. The digital audiovisual file storage system as recited in claim 16, further comprising:

a means for performing rewinding or fast forwarding through the audiovisual file by using the average storage unit per time unit rate to calculate how much of the storage medium to skip over.

19. The digital audiovisual file storage system as recited in claim 10, wherein the means for re-calculating an estimated storage position comprises:

a means for determining a number of iterations that have been previously performed; and a means for ending the method if the determined number of iterations exceeds a predetermined limit.

20. The digital audiovisual file storage system as recited in claim 10, wherein the means for re-calculating an estimated storage position comprises:

a means for calculating a delta distance, wherein the delta distance may be a positive or negative number; and a means for calculating a new estimated storage position by adding the calculated delta distance to the current estimated storage position.

21. The digital audiovisual file storage system as recited in claim 20, wherein the delta distance is calculated using the following equation:

$$\begin{bmatrix} \text{Delta} \\ \text{Distance} \end{bmatrix} = \begin{bmatrix} \text{Sectorlength} \\ \text{Timelength} \end{bmatrix} * \begin{bmatrix} \text{Desired} \\ \text{Timepoint} \end{bmatrix} - \begin{bmatrix} \text{Estimated} \\ \text{Timepoint} \end{bmatrix} ; \text{ and}$$

wherein Sectorlength is the total storage unit length of the audiovisual file,

Timelength is the total timelength of the audiovisual file, and Estimated

Timepoint is the indicated timepoint in step (f).

22. A Moving Pictures Expert Group (MPEG) file storage and retrieval system for performing a jump function to a desired timepoint in an MPEG file comprising:

at least one MPEG file source for supplying the MPEG file;

an integrated receiver decoder (IRD) for receiving the MPEG file from the at least one MPEG source, said IRD comprising:

a first storage medium for storing the received MPEG file and an associated filenode, wherein the filenode comprises a total timelength of the MPEG file and a total storage unit length of the MPEG file;

a processor;

a second storage medium for storing programming code executable on said processor, the stored programming code including:

code for adding recording headers in the MPEG file on the storage medium, wherein the recording headers are distinct from a MPEG file datastream;

code for setting a timestamp in each recording header;

code for storing an associated filenode on the storage medium;

code for calculating an estimated storage position on the storage medium of the desired timepoint;

code for jumping to the estimated storage position;

code for finding a recording header near to the estimated storage position;

code for reading a timestamp in the recording header;

code for determining if a timepoint indicated by the timestamp is within a predetermined time of the desired timepoint; and code for re-calculating a new estimated storage position.

23. The MPEG file storage and retrieval system as recited in claim 22, wherein the code for calculating an estimated storage position on the storage medium of the desired timepoint comprises:

code for retrieving a total timelength of the MPEG file from the associated filenode;

code for retrieving a total storage unit length of the MPEG file from the associated filenode;

code for calculating an average storage unit per time unit rate by dividing the total storage unit length by the total timelength; and code for calculating an estimated storage position by multiplying the average storage unit per time unit by the desired timepoint.

24. The MPEG file storage and retrieval system as recited in claim 22, wherein the code for re-calculating a new estimated storage position comprises:

code for determining a number of iterations that have been previously performed;

code for returning a current estimated position if the determined number of iterations exceeds a predetermined limit;

code for calculating a delta distance, wherein the delta distance may be a positive or negative number; and code for calculating a new estimated storage position by adding the calculated delta distance to the current estimated storage position.

* * * * *